(12) United States Patent
Li

(10) Patent No.: US 7,370,994 B2
(45) Date of Patent: May 13, 2008

(54) COLLIMATING LENS FOR LED LAMP

(75) Inventor: Hung-Chih Li, Taichung (TW)

(73) Assignee: Genius Electronic Optional Co., Ltd., Taichung (TW)

( * ) Notice: Subject to any disclaimer, the term of this patent is extended or adjusted under 35 U.S.C. 154(b) by 0 days.

(21) Appl. No.: 11/403,817

(22) Filed: Apr. 14, 2006

(65) Prior Publication Data
US 2007/0159847 A1    Jul. 12, 2007

(51) Int. Cl.
*F21V 5/04* (2006.01)
(52) U.S. Cl. ....................... 362/335; 359/708
(58) Field of Classification Search ................ 362/333, 362/334, 335
See application file for complete search history.

(56) References Cited

U.S. PATENT DOCUMENTS 2,254,962 A * 9/1941 Harris et al. ................ 362/327
5,343,330 A * 8/1994 Hoffman et al. ............ 359/708
6,536,923 B1 * 3/2003 Merz .......................... 362/327
6,547,423 B2 * 4/2003 Marshall et al. ............ 362/333
6,560,038 B1 * 5/2003 Parkyn et al. .............. 359/726
7,111,964 B2 * 9/2006 Suehiro et al. ............. 362/328

* cited by examiner

Primary Examiner—Hargobind S. Sawhney
(74) Attorney, Agent, or Firm—Browdy and Neimark

(57) ABSTRACT

A collimating lens includes a first end face with an LED accommodation hole for accommodating an LED lamp, a second end face, which is disposed opposite to the first end face and has an area greater than the first end face, and a sidewall, which is connected between the first end face and the second end face and has a first wall section and a second wall section. The second wall section extends from the second end face toward the first end face to a predetermined distance. The first wall section having one end connected to the second wall section and the other end extending toward the first end face to a predetermined distance. The first wall section defines with the second wall section a contained angle smaller than 180°.

7 Claims, 3 Drawing Sheets

COLLIMATING LENS FOR LED LAMP

BACKGROUND OF THE INVENTION

1. Field of the Invention

The present invention relates to LED lamps and more specifically, to a collimating lens for LED lamp.

2. Description of the Related Art

FIG. 5 shows a conventional collimating lens 90 used with an LED lamp 98. The collimating lens 90 has a top face 92, a bottom face 94, and a sidewall 96. An accommodation hole 942 is formed on the bottom face 94 for accommodating the LED lamp 98. The sidewall 96 has a first wall section 962 and a second wall section 964. The first wall section 962 obliquely upwardly extends from the bottom face 94 and connected to the bottom side of the second wall section 964. The second wall section 964 extends vertically upwards from the top side of the first wall section 962, and is connected to the top face 92 at right angles. The first wall section 962 and the second wall section 964 define a contained angle greater than 180°. When the LED lamp 98 is turned on to give off light, radially emitting light rays from the LED lamp 98 are repeatedly refracted between the top face 92 and sidewall 96 of the collimating lens 90 and finally sent out of the collimating lens 90 through the top face 92 in direction approximately perpendicular to the top face 92. Therefore, the collimating lens 92 concentrates the light of the LED lamp 98 into a directional light beam.

According to the aforesaid design, the first wall section 962 and the second wall section 964 define a contained angle greater than 180°. When the top face 92 refracts the light of the LED lamp 98 onto the second wall section 964, a part of the refracted light passes through the second wall section 964 due to excessively big incident angle, causing dispersion of light source and lowering the illumination performance of the lamp.

SUMMARY OF THE INVENTION

The present invention has been accomplished under the circumstances in view. It is therefore one object of the present invention to provide a collimating lens for LED lamp, which effectively concentrates the light of the LED lamp, enhancing the illumination effect.

To achieve this object of the present invention, the collimating lens comprises a first end face having an LED accommodation hole for accommodating an LED lamp, a second end face, which is disposed opposite to the first end face and has an area greater than the first end face, and a sidewall connected between the first end face and the second end face. The sidewall has a first wall section and a second wall section. The second wall section extends from a predetermined location at the second end face toward the first end face to a predetermined distance. The first wall section has one end connected to the second wall section and the other end extending toward the first end face to a predetermined distance. The first wall section and the second wall section define a contained angle smaller than 180°.

DETAILED DESCRIPTION OF THE INVENTION

Figure 1:
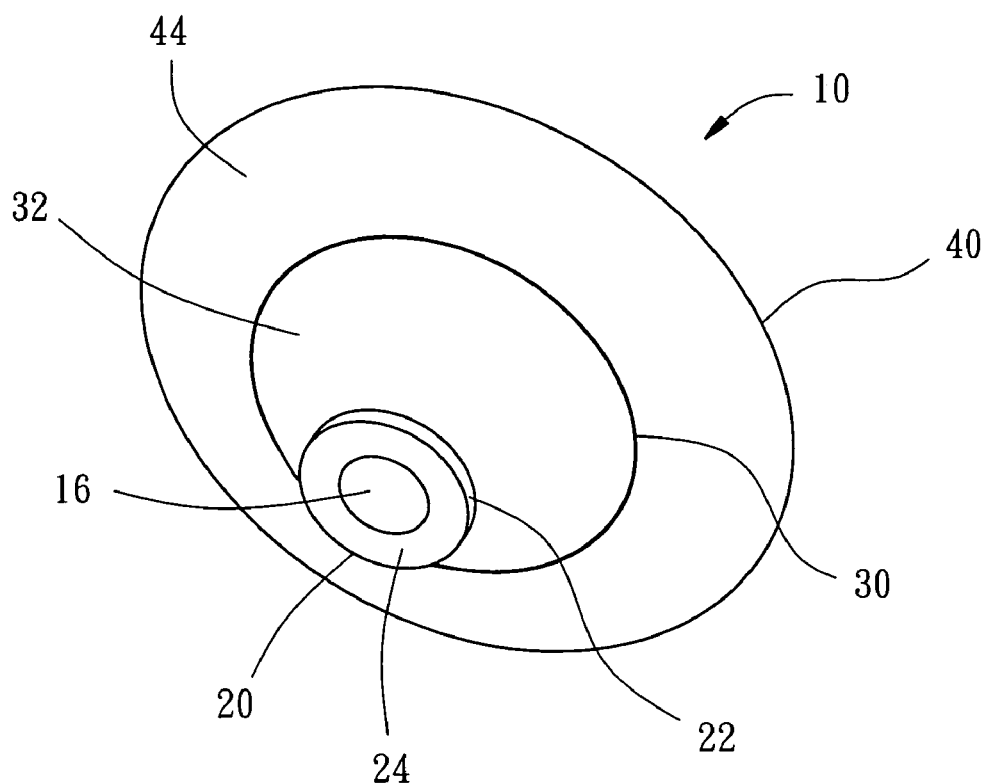
FIG. 1 is a perspective view of a collimating lens according to a first preferred embodiment of the present invention.
Figure 2:
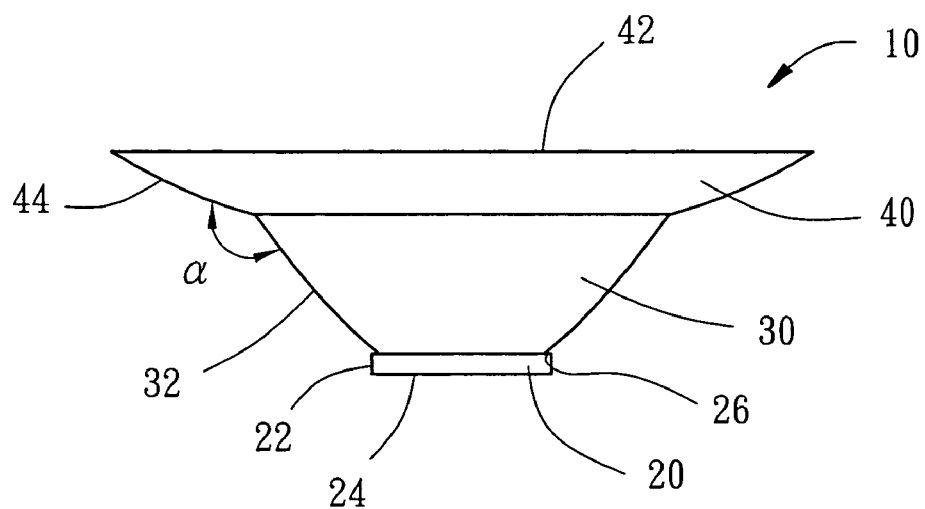
FIG. 2 is a side plain view of the collimating lens according to the first preferred embodiment of the present invention.
Figure 3:
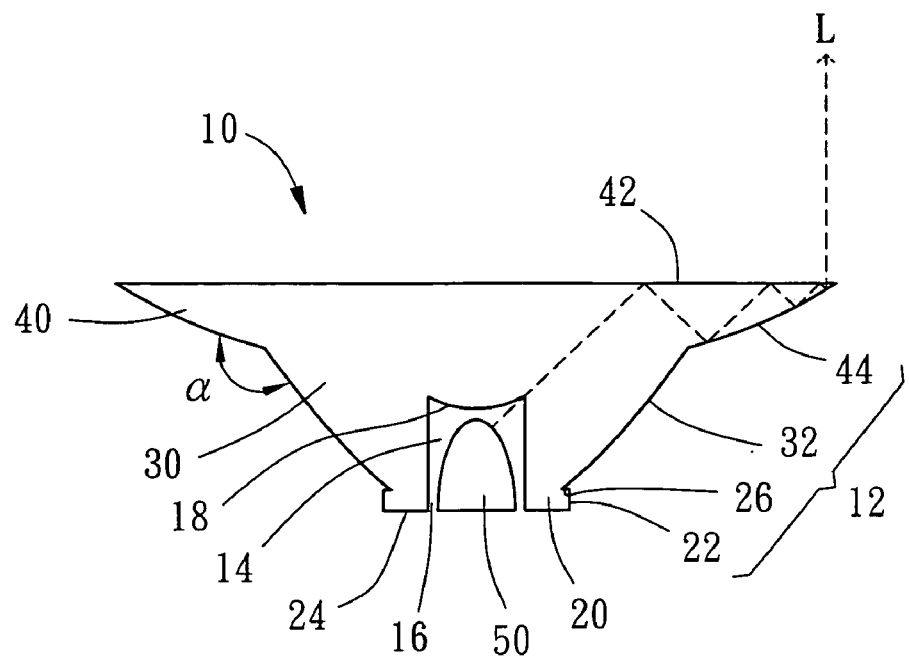
FIG. 3 is a schematic drawing showing an application example of the collimating lens according to the first preferred embodiment of the present invention.

Referring to FIGS. 1-3, a collimating lens 10 in accordance with a first preferred embodiment of the present invention is shown made of a transmittance material, such as plastics or glass, comprising a base 20, a body 30, and a top 40.

The base 20 is shaped like a stub cylinder. The periphery of the base 20 configures a third wall section 22. The base 20 further configures a first end face 24 at the bottom side of the third wall section 22, and a fourth wall section 26 connected to the top side of the third wall section 22 at right angles.

The body 30 expands gradually outwards from the base 20. The periphery of the body 30 configures a first wall section 32, which is an arched surface connected to the fourth wall section 26.

The top 40 expands gradually outwards from the body 30 and terminates in a flat second end face 42 that has an area greater then the first end face 24. The periphery of the top 40 configures a second wall section 44, which is an arched surface.

The third wall section 22 and fourth wall section 26 at the base 20 forms with the first wall section 32 at the body 30 and the second wall section 44 at the top 40 the sidewall 12 of the collimating lens 10. The outer surface of the first wall section 32 and the outer surface of the second wall section 44 define a contained angle ($\alpha$) which can be in the range of 0-180°, According to this embodiment, the contained angle ($\alpha$) is about 150°.

The collimating lens 10 further has an LED accommodation hole 14, which is a round hole having an opening 16 at the center of the first end face 24 for accommodating an LED lamp 50. The collimating lens 10 further has a convex surface 18 that configures the inner top wall of the LED accommodation hole 14.

Referring to FIG. 3 again, when the light L of the LED lamp 50 is falling in the collimating lens 10, if the incident angle of the light L falling in the second end face 42 is too small, the light L will be refracted by the second end face 42 onto the second wall section 44. Because the outer surface of the second wall section 44 and the outer surface of the first wall section 32 define a contained angle ($\alpha$) smaller than 180°, the light L is refracted again onto the second end face 42. Thus, the light L is repeatedly refracted between the second end face 42 and the second wall section 44, and finally sent out of the collimating lens 10 through the second end face 42 in direction substantially perpendicular to the second end face 42, as shown in FIGS. 3 and 4.

As indicated above, the collimating lens 10 utilizes the design of the contained angle ($\alpha$) between the outer surface of the first wall section 32 and the outer surface of the second wall section 44 to be smaller than 180° to concentrate the light L of the LED lamp 50, enhancing the illumination effect.

Figure 4:
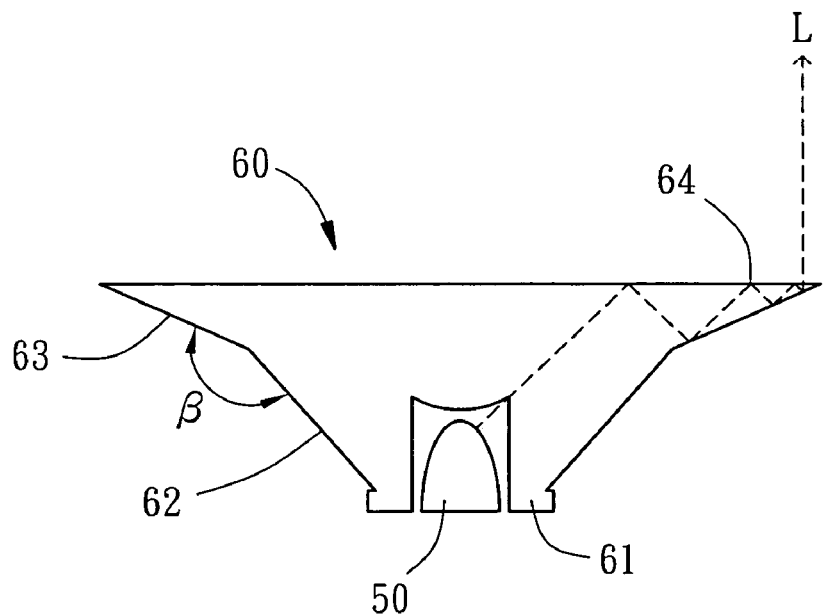
FIG. 4 is a schematic drawing showing an application example of a collimating lens according to a second preferred embodiment of the present invention.
Figure 5:
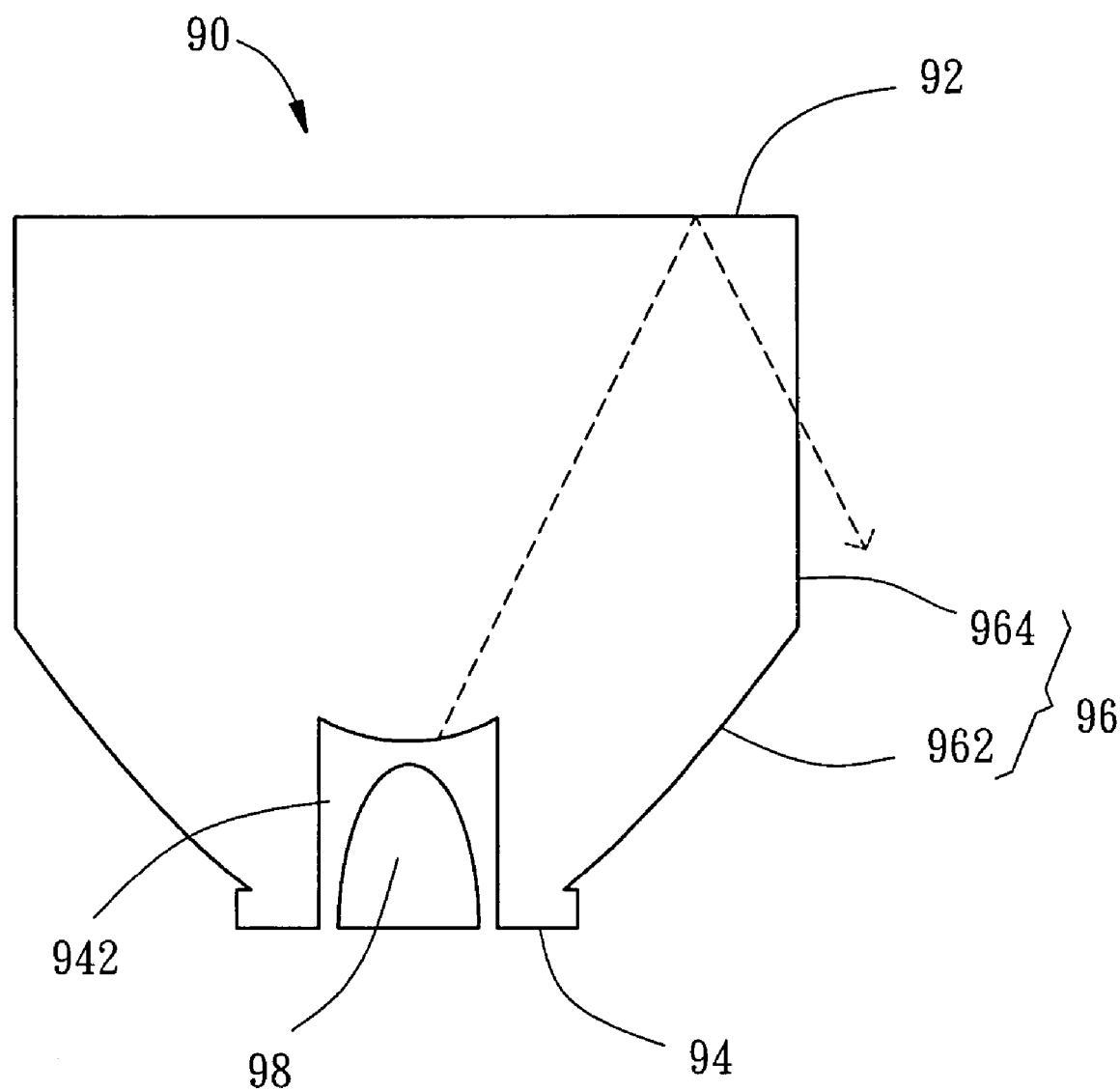
FIG. 5 is a schematic drawing showing an application example of a collimating lens according to the prior art.

FIG. 4 shows a collimating lens 60 for LED lamp in accordance with a second preferred embodiment of the present invention. This embodiment is substantially similar to the aforesaid first embodiment with the exceptions described hereinafter. According to this embodiment, the first wall section 62 expands straightly outwards from the two ends of the base 61, forming a plane. The second wall section 63 expands gradually and straightly outwards from the top side of the first wall section 62, forming a flat outer surface.

The outer surface of the first wall section 62 and the outer surface of the second wall section 63 define a contained angle (β) that can be within 0-180°. This design enables the light L of the LED lamp 50 to be repeatedly refracted between the second end face 64 and the second wall section 63 and then finally sent out of the collimating lens 10 through the second end face 64 in direction approximately perpendicular to the second end face 64. Therefore, this second embodiment achieves the same effect as the aforesaid first embodiment of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A collimating lens made of a light transmissive material, comprising:

a base, a body extending outwards from said base, and a top extending outwards from said body, said base having a first end face, said top having a flat second end face, said second end face having an area greater than said first end face, a periphery of said body configuring a first wall section, a periphery of said top configuring a second wall section, an outer surface of said first wall section and an outer surface of said second wall section defining a contained angle $\alpha$, $\beta$ between the outer surfaces of the first and the second wall sections which is less than 180°, said base having a third wall section and fourth section, said third wall section being formed of the periphery of said base, said fourth wall section extending perpendicular from said third wall section and connected to said first wall section;

wherein said collimating lens further comprises an LED accommodation hole, which is a round hole having an opening at the center of the first end face for accommodating an LED lamp, and a convex surface configuring an inner top wall of said LED accommodation hole;

wherein the angle $\alpha$, $\beta$ results in light L produced by the LED lamp following a path which passes over the first wall section and is refracted by the second end face to the second wall section where the light L is refracted out through the second wall section.

2. The collimating lens as claimed in claim 1, wherein said first wall section is an arched surface.

3. The collimating lens as claimed in claim 1, wherein said second wall section is an arched surface.

4. The collimating lens as claimed in claim 1, wherein said first wall section is a plane.

5. The collimating lens as claimed in claim 1, wherein said second wall section is a plane.

6. The collimating lens as claimed in claim 1, wherein said contained angle $\alpha$, $\beta$ is 150°.

7. The collimating lens as claimed in claim 1, wherein the light is refracted out substantially perpendicular to the second wall section.

* * * * *